Nov. 26, 1929.　　　J. R. GAMMETER　　　1,737,415
PNEUMATIC TIRE AND METHOD OF MANUFACTURING THE SAME
Filed March 14, 1928　　2 Sheets-Sheet 1

Inventor
John R. Gammeter
By Ely & Barrow
Attys-

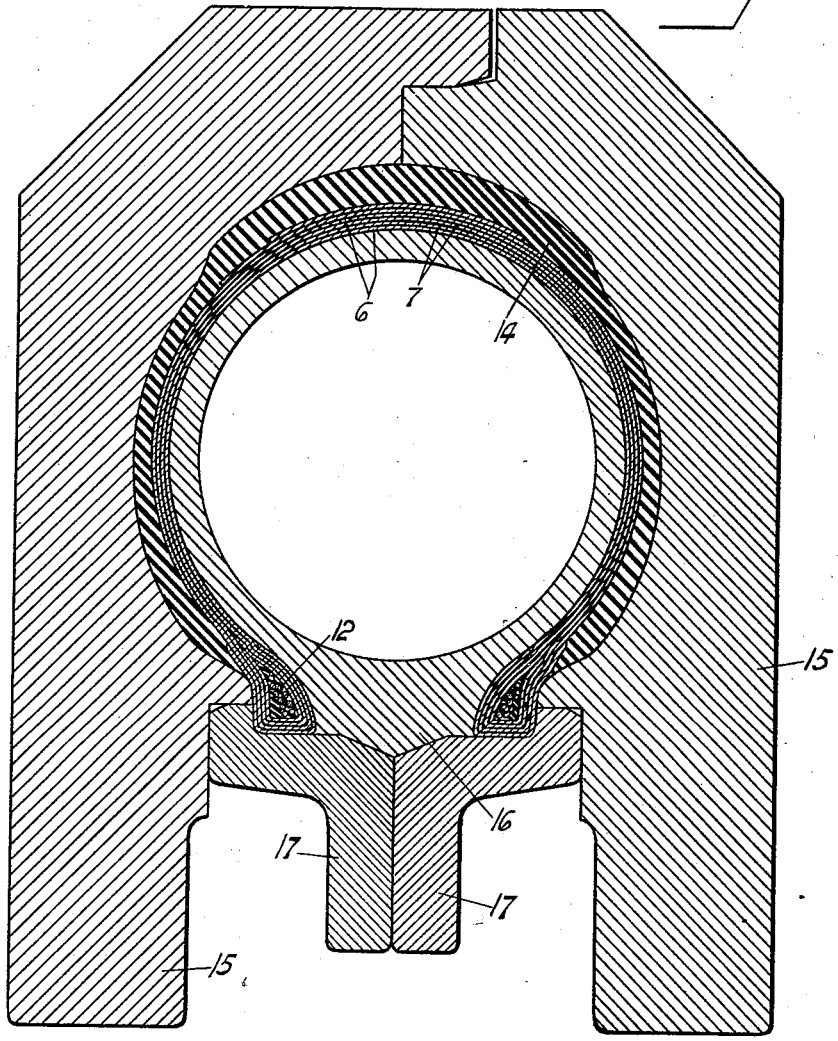

Patented Nov. 26, 1929

1,737,415

UNITED STATES PATENT OFFICE

JOHN R. GAMMETER, OF AKRON, OHIO

PNEUMATIC TIRE AND METHOD OF MANUFACTURING THE SAME

Application filed March 14, 1928. Serial No. 261,448.

This invention relates to the manufacture of pneumatic tires and particularly to the so-called "flat band" method of building carcasses. The object of the invention is to simplify and improve upon existing methods of building tires of this general type, and having advantages of economy of operation and rapidity and ease of building.

The details of the invention are described herein and are shown in the drawings, which illustrate one form of the invention, it being understood that having explained the invention in the best form known at present, changes and modifications may be made within the scope and purview of the invention as set forth in the claims appended hereto.

In the drawings:

Figure 4 is a cross section through a tire in the vulcanizing mold.

The tire, which is shown as a straight-side tire, is constructed upon a collapsible drum, the outer periphery of which is indicated by the numeral 1 and the expanding and collapsing mechanism at 2. This drum is wider than the usual tire building drum of this type. For the manufacture of straight-side tires it is preferable to provide an enlarged arched or crowned area 3 at one side of the drum over which the main body of the tire is built up, the edges of this area being formed by inclined portions 5 upon which the beaded portions of the tire are built up.

Figure 1:
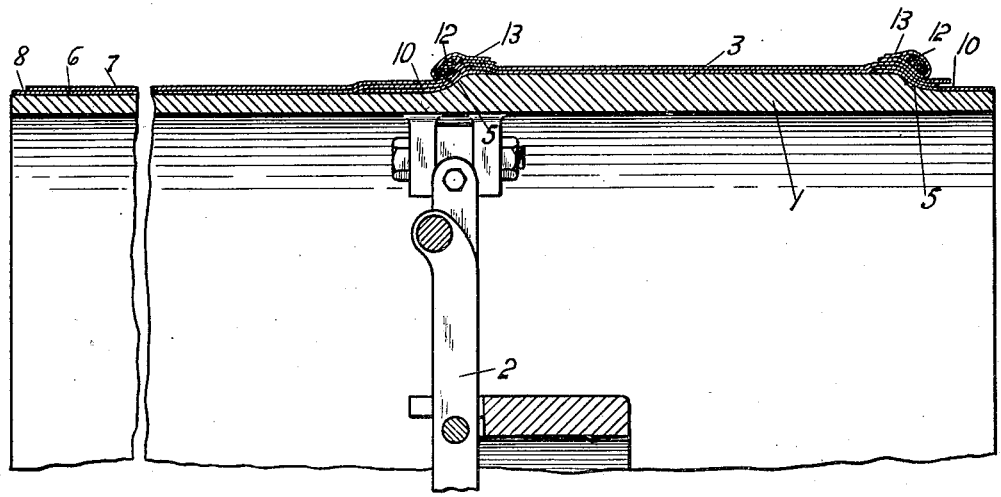
Figure 1 is a cross section of a drum showing a tire partially completed thereon.
Figure 2:
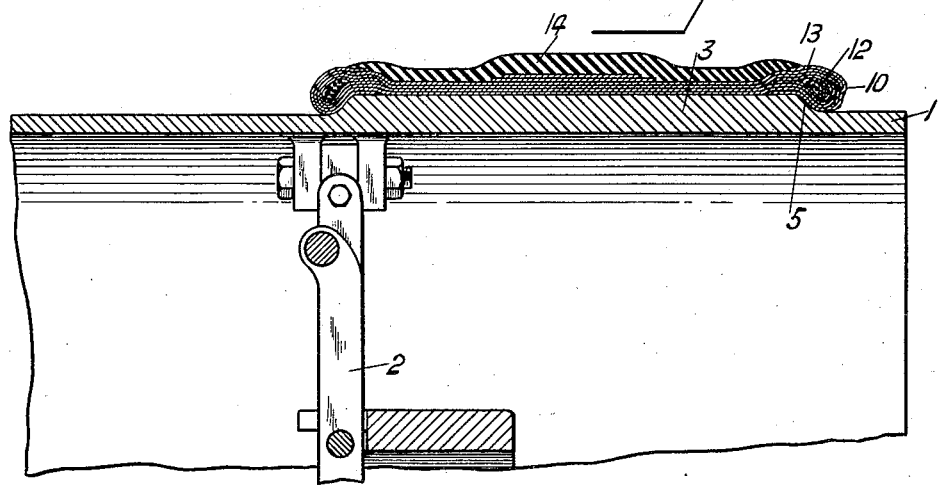
Figure 2 is a similar section showing the tire made up in form ready to be shaped and vulcanized.

The tire which is here shown as made up of four plies in the finished carcass is made up of two strips or bands 6 and 7 of cord fabric cut at the appropriate oblique angle, these bands being of the same width but stepped-off from one another, as indicated at 8. The first step in building the tire is to apply narrow chafer strips 10 over the inclined portions 5. The fabric plies 6 and 7 are then laid over the drum, with the cords of one layer crossing the cords of the other and one half of the two ply band resting over the area 3 and the other half over the wide skirt at the side of this area. The tire beads 12, which are surrounded by the usual flippers 13, are then applied over the edges 5 and the half of the plies extending over the skirt of the drum is brought over until the edges of these plies overlap the beads. The chafer strip 10 is then brought around the beads. The tread and side wall elements are then applied, as shown at 14 in Figure 2. This completes the flat carcass. Rolling operations may be carried out as each portion of the tire is laid over the drum, to insure perfect union of the parts of the carcass.

The carcass is removed from the drum and shaped by any suitable method or machine to bring the tire from its flat to arched condition, and placed in the mold 15, an air bag 16 and bead rings 17 being applied to the tire in the usual manner, the vulcanization being completed in the usual manner.

The advantages of the present method reside in the simplicity and ease with which the tire is built up. It also resides in the saving of fabric, it being possible to cut the plies to the exact width required, thereby saving the waste previously encountered in the various trimming or turning operations required at the bead of the tire.

Figure 3:
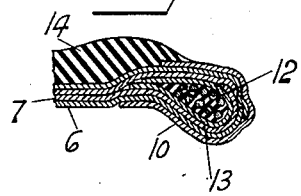
Figure 3 is a detail of the bead.

It will be observed that in addition to a new process of manufacturing tires, which is economical and can be carried on without waste, the structure of the resulting tire is new. The tire is of the thickness of four plies, but only two plies of fabric are actually used, one of the beads being enclosed by the fold in the fabric and the other bead by the overlapping edges of the fabric. The stepped-off plies nest about the bead, as shown in Figure 3, and the interlocking construction thereby provided, is ample for holding the beads in place.

The several strips which constitute two plies may be folded at approximately the center line of each strip at one bead, while the edges of the strips meet and unite at the other bead. It will be obvious that exactness as to these points is not necessary and approximate location at the bead lines are all that are required to constitute the invention. The claims are, therefore, not necessarily limited to exact locations and such expressions as are used therein are intended to be approximate only.

What is claimed is:

1. A process of manufacturing tires, comprising laying up a plurality of plies of cord fabric in substantially cylindrical form, the cords in adjacent plies crossing one another, applying a bead to one edge of the plies and a second bead at approximately the center line of the plies, folding the plies over the second bead and uniting the edges thereof around the first bead, shaping the band thus obtained, and vulcanizing.

2. A process of manufacturing tires, comprising laying up a plurality of plies of cord fabric in a band of approximately double the width of a tire casing, applying beads on one half of the band, folding the other half of the band over the beads and uniting it to the half of the band carrying the beads with the edges of the fabric united about one of said beads, shaping the band thus obtained, and vulcanizing.

3. A process of manufacturing tires, comprising laying up plies of cord fabric of equal width with the edges stepped-off, wrapping said plies about a drum to form a two ply band, applying beads at the requisite distance apart on one half of the band, folding the other half of the band over the beads, uniting the edges of the band along one edge of the tire carcass, shaping the flat carcass, and vulcanizing.

4. A process of manufacturing tires, comprising laying up two plies of cord fabric cut at an angle to the cords, the plies being arranged with the cords in adjacent plies crossing each other, forming a band from the plies, applying beads on one half of the band, folding the band over said beads until the edges meet, applying the finishing elements to the band, and shaping and vulcanizing the carcass thus obtained.

5. A process of manufacturing tires, comprising laying up two plies of cord fabric cut at an angle to the cords, the plies being arranged with the cords in adjacent plies crossing each other, forming a band from the plies, one half of said band being of greater diameter than the other half, applying beads to the edges of that portion of the band of greater diameter, and folding the smaller diameter portion thereover to enclose the beads and complete the tire carcass.

6. A process of manufacturing tires, comprising laying up two plies of cord fabric cut at an angle to the cords, the plies being arranged with the cords in adjacent plies crossing each other and stepped-off from one another, forming a band from the plies, one half of said band being of greater diameter than the other half, applying beads to the edges of that portion of the band of greater diameter, and folding the smaller diameter portion thereover to enclose the beads and complete the tire carcass.

7. A tire construction having a carcass composed of two plies of cord fabric superposed upon one another and folded at approximately its center line about one bead of the tire, the edges of the plies being united at or adjacent to the bead.

8. A tire construction having a carcass composed of two plies of cord fabric superposed upon one another and folded at approximately its center line about one bead of the tire, the edges of the plies being stepped-off with relation to one another and united at or adjacent to the bead.

9. A tire carcass comprising a single cord fabric strip forming the innermost and outside plies and a second cord fabric forming the intermediate plies, the said strips being folded about one bead at approximately the center line of the strip and the edges of the strips meeting at the other bead.

JOHN R. GAMMETER.